(12) United States Patent
Van Den Aker (10) Patent No.: US 7,832,446 B2
(45) Date of Patent: Nov. 16, 2010

(54) METHOD AND DEVICE FOR MANUFACTURING A COMPOSITE WEB ON THE BASIS OF AT LEAST TWO WEBS

(75) Inventor: Martinus Cornelus Adrianus Van Den Aker, Tilburg (NL)

(73) Assignee: Beiler Beheer B.V., Tilburg (NL)

(*) Notice: Subject to any disclaimer, the term of this patent is extended or adjusted under 35 U.S.C. 154(b) by 762 days.

(21) Appl. No.: 11/414,911

(22) Filed: May 1, 2006

(65) Prior Publication Data
US 2006/0252331 A1 Nov. 9, 2006

(30) Foreign Application Priority Data
May 4, 2005 (NL) .................................... 1028977

(51) Int. Cl.
| B29C 65/76 | (2006.01) |
| B32B 37/00 | (2006.01) |
| B32B 38/04 | (2006.01) |
| B32B 38/10 | (2006.01) |
| B32B 43/00 | (2006.01) |

(52) U.S. Cl. ........................ 156/510; 156/511; 156/516; 156/517; 156/519

(58) Field of Classification Search .................. 156/71, 156/250, 263, 265, 272.2, 273.1, 273.3, 274.4, 156/307.1, 307.3, 308.2, 350, 379.9, 433, 156/437, 510, 511, 516, 517, 519, 264, 549
See application file for complete search history.

(56) References Cited

U.S. PATENT DOCUMENTS

| 2,562,891 A | * | 8/1951 | Cotchett ...................... 19/144 |
| 2,710,992 A | * | 6/1955 | Goldman ................... 19/161.1 |
| 3,684,604 A | * | 8/1972 | Sager .......................... 156/171 |
| 5,173,138 A | * | 12/1992 | Blauch et al. ............... 156/177 |
| 5,401,446 A | * | 3/1995 | Tsai et al. .................... 264/484 |
| 5,766,725 A | | 6/1998 | Hogenboom et al. |

FOREIGN PATENT DOCUMENTS

| WO | WO 2005/077799 A2 | 8/2005 |
| WO | WO 2005/077799 A3 | 8/2005 |

OTHER PUBLICATIONS

Search Report for Priority Netherlands Application No. NL1028977.5, dated Jan. 17, 2006.

* cited by examiner

*Primary Examiner*—Philip C Tucker
*Assistant Examiner*—Sing P Chan
(74) *Attorney, Agent, or Firm*—Ryan A. Schneider, Esq.; Troutman Sanders LLP (57) ABSTRACT

A device for manufacturing a crosslaid fiber web on the basis of two parallel longitudinal fiber webs and segments of another longitudinal fiber web comprises a fixing table on which the longitudinal fiber webs and the segments come together. Furthermore, the device comprises a pair of high-voltage bars, movably arranged with respect to the fixing table. When a segment is in a correct end position with respect to the longitudinal fiber webs on the fixing table, the pair of high-voltage bars is activated and moved with respect to the segment and the longitudinal fiber webs, wherein the segment and the longitudinal fiber webs are situated between the high-voltage bars. As a consequence, the segment is fixed with respect to the longitudinal fiber webs, before being supplied to another device in order to get definitively connected to the longitudinal fiber webs.

16 Claims, 5 Drawing Sheets

METHOD AND DEVICE FOR MANUFACTURING A COMPOSITE WEB ON THE BASIS OF AT LEAST TWO WEBS

FIELD OF THE INVENTION

The present invention relates in general to a method for manufacturing a composite web on the basis of at least two webs of which material is oriented substantially in a defined direction.

BACKGROUND OF THE INVENTION

An example of a web as mentioned above is a longitudinal fiber web, which comprises a carrier matrix and mutually parallel fibers which are embedded in the carrier matrix. In the longitudinal fiber web, a longitudinal direction of the fibers is parallel to a longitudinal direction of the web. On the basis of at least two longitudinal fiber webs, a crosslaid fiber web may be formed, i.e. a layered web having at least two layers, wherein the layers are fixedly connected to each other, and wherein each layer of the crosslaid fiber web comprises a carrier matrix and mutually parallel fibers which are embedded in the carrier matrix. An important feature of the crosslaid fiber web is that the longitudinal directions of fibers in successive layers are mutually different. For example, the fibers of successive layers may be extending at an angle of 90° with respect to each other.

A known method for manufacturing a crosslaid web, as described in NL 1006092, for example, comprises the following steps:
  providing a cut-off segment of a first longitudinal fiber web;
  providing a second longitudinal fiber web; and
  moving the cut-off segment of the first longitudinal fiber web and the second longitudinal fiber web toward each other, until the segment and the second longitudinal fiber web have reached an end position with respect to each other, in which the segment and the second longitudinal fiber web are positioned on top of each other, while at least a substantial part of the segment overlaps the second longitudinal fiber web.

In practice, for the purpose of manufacturing a crosslaid fiber web, a device is applied, to which at least two longitudinal fiber webs are supplied. In a known embodiment, such a device is suitable for manufacturing a crosslaid fiber web on the basis of a first longitudinal fiber web and a second longitudinal fiber web, which are wound off a storage reel or the like, and which are supplied to the device at an angle of 90°. In this known embodiment, the device comprises a cutting device for cutting off segments of the first longitudinal fiber web. The cut-off segments of the first longitudinal fiber web and the second longitudinal fiber web come together in a positioning area. In particular, the segments and the second longitudinal fiber web are put to a suitable end position with respect to each other, in which the segment and the second longitudinal fiber web are positioned on top of each other, while at least a substantial part of the segment overlaps the second longitudinal fiber web. By subsequently connecting the segments and the second longitudinal fiber web to each other, the crosslaid fiber web is obtained. In order to guarantee that the obtained crosslaid fiber web is a continuous web, successive segments are positioned in an adjoining fashion.

The segments and the second longitudinal fiber web may already be connected to each other in the positioning area, for example in case the second longitudinal fiber web is provided with a layer of glue. It is also possible that the segments and the second longitudinal fiber web are transported further, out of the positioning area, and are connected to each other at another place. For the purpose of establishing a connection between the segments and the second longitudinal fiber web, a laminating device may be provided, for example.

The present invention relates to a manufacturing process of a composite web such as a crosslaid fiber web, wherein the connection between the cut-off segments of a first web and a second web is established outside the positioning area. A problem that is related to such a process is that there is a risk that the segments displace with respect to the second web when the segments and the second web are transported out of the positioning area to a place where the connection between the segments and the second web will be established. When displacement of the segments with respect to the second web occurs, the segments of the second web are no longer in the correct end position with respect to each other. This leads to irregularities in the composite web to be manufactured, which is very undesirable.

SUMMARY OF THE INVENTION

The present invention provides a solution to the above-described problem of the occurrence of displacement of the segments with respect to the second web. More in particular, a method for manufacturing a composite web is provided, which comprises the following steps:
  providing a cut-off segment of a first web, wherein material of the first web is oriented substantially in a first direction;
  providing a second web, wherein material of the second web is oriented substantially in a second direction;
  moving the cut-off segment of the first web and the second web toward each other, until the segment and the second web have reached an end position with respect to each other, in which the segment and the second web are positioned on top of each other, while at least a substantial part of the segment overlaps the second web;
  fixing the segment and the second web with respect to each other as soon as the segment and the second web have reached the end position with respect to each other; and
  further transporting the segment and the second web after they have been fixed with respect to each other.

According to the present invention, the segment and the second web are fixed with respect to each other as soon as the segment and the second web have reached the end position with respect to each other. In the process, the mutual positioning of the segment and the second web may take place in an accurate manner. After the mutual fixation of the segment and the second web has taken place, the segment and the second web are transported further. In a practical application of the method according to the present invention, the segment and the second web are further transported to a device for establishing a definitive connection between the segment and the second web.

The method according to the present invention is especially suitable to be applied for the purpose of forming a composite web which is formed out of relatively thin webs. By applying the method, it is ensured that the segments and the second web are in the correct end position with respect to each other at the moment the segments and the second web are definitively connected to each other. In this manner, it is ensured that a composite web which is formed on the basis of the segments and the second web has a regular structure, and is fully usable for further applications.

Within the scope of the present invention, various possibilities exist in respect of fixing the segment and the second web with respect to each other. For example, fixation may take place on the basis of static electricity, wherein the segment and the second web are charged with static electricity, and, as a consequence, exert an attractive force on each other. It is also possible that fixation takes place on the basis of heating at least one of the segment and the second web, wherein the segment and the second web get stuck to one another, for example in case the segment and the second web comprise plastic, particularly a thermoplastic or a plastic that needs to be activated. This effect may also be achieved by providing at least one of the segment and the second web with a layer of glue. The mentioned possibilities are well realizable in practice, which does not alter the fact that other possibilities exist.

By applying the present invention, it is achieved that, in the positioning area, the segment and the second web are fixed with respect to each other in the correct position with respect to each other. When the segment and the second web are transported further, out of the positioning area, their mutual position is maintained. Also, by applying the present invention, it is prevented that in manufacturing the layered web, tensions are introduced into the segment and/or the second web, which is important in view of the quality and the desired properties of the layered web.

Within the scope of the present invention, for the purpose of fixing the segment and the second web with respect to each other on the basis of static electricity, various suitable fixing means may be applied, particularly fixing means which are adapted to create a potential difference between the segment and the second web. In a practical embodiment, the fixing means comprise a pair of movably arranged high-voltage members, which, in an activated condition, is capable of creating a potential difference between the segment and the second web. When this pair of high-voltage members is put to the activated condition and is moved with respect to the segment and the second web, while the segment and the second web are situated between the high-voltage members, the segment and the second web are charged with static electricity, and, as a consequence, exert an attractive force on each other.

Preferably, the applied high-voltage members are shaped like a bar, wherein one bar is moved along the segment and the second web at the side of the segment, and wherein another bar is moved along the segment and the second web at the side of the second web, while a mutual positioning of the bars is maintained.

The present invention also relates to a device for carrying out the above-described method in which the segment and the second web are put to the correct end position with respect to each other, and are subsequently fixed with respect to each other on the basis of static electricity, before being transported further. In a practical embodiment, the device according to the present invention comprises a fixing table having a supporting surface for supporting the segment and the second web and high-voltage members which are movably arranged with respect to the fixing table. When the segment and the second web are in the end position with respect to each other and are resting on the supporting surface, the high-voltage members are moved along the segment and the second web, while the segment and the second web remain in their places. In this context, it is important that the supporting surface is locally interrupted, wherein one of the high-voltage members is arranged at the position of the interruption, at a level substantially equal to the supporting surface. In this manner, it is achieved that the action of the high-voltage member on the segment and the second web may take place without hindrance.

For example, the supporting surface may comprise a surface of a conveyor belt, wherein diversion means are provided for diverting the conveyor belt at the position of the high-voltage member. Preferably, these diversion means, together with the high-voltage member, are mounted on one movable carrier, as a result of which it is achieved that a movement of the high-voltage member is obtained by a movement of the carrier, while the diversion of the conveyor belt at the position of the high-voltage member is maintained.

The segment and the second web are supplied to the positioning area at different levels. Due to this, a situation in which the segment could bump against the second web, and, as a consequence, could curl, is avoided. When the segment and the second web are in a correct mutual position at the different levels, the segment and the second web are first put into contact with each other, before the high-voltage members are moved along the segment and the second web.

Preferably, the high-voltage members are adapted to create a relatively large potential difference between the segment and the second web, preferably a potential difference which is within a range of 10 to 50 kilovolts. That does not alter the fact that, within the scope of the present invention, other values are also possible in respect of the potential difference between the segment and the second web.

Within the scope of the present invention, for the purpose of fixing the segment and the second web with respect to each other under the influence of heat, various suitable fixing means may be applied, particularly fixing means which are adapted to heat at least one of the segment and the second web. In a practical embodiment, the fixing means comprise a movably arranged heated roll, which is moved over one of the segment and the second web, and, by doing so, causes the segment and the second web to get stuck to one another, wherein it is important to note that this getting stuck to one another does not need to be so strong as a desired definitive connection between the segment and the web.

Among other things, the method according to the present invention is suitable for manufacturing a composite web which is destined to be applied in an inflatable body such as an airbag.

BRIEF DESCRIPTION OF THE DRAWINGS

The present invention will be explained in greater detail on the basis of the following description of the invention with reference to the drawing, in which equal reference signs indicate equal or similar parts, and in which.

DETAILED DESCRIPTION OF THE INVENTION

Figure 1:
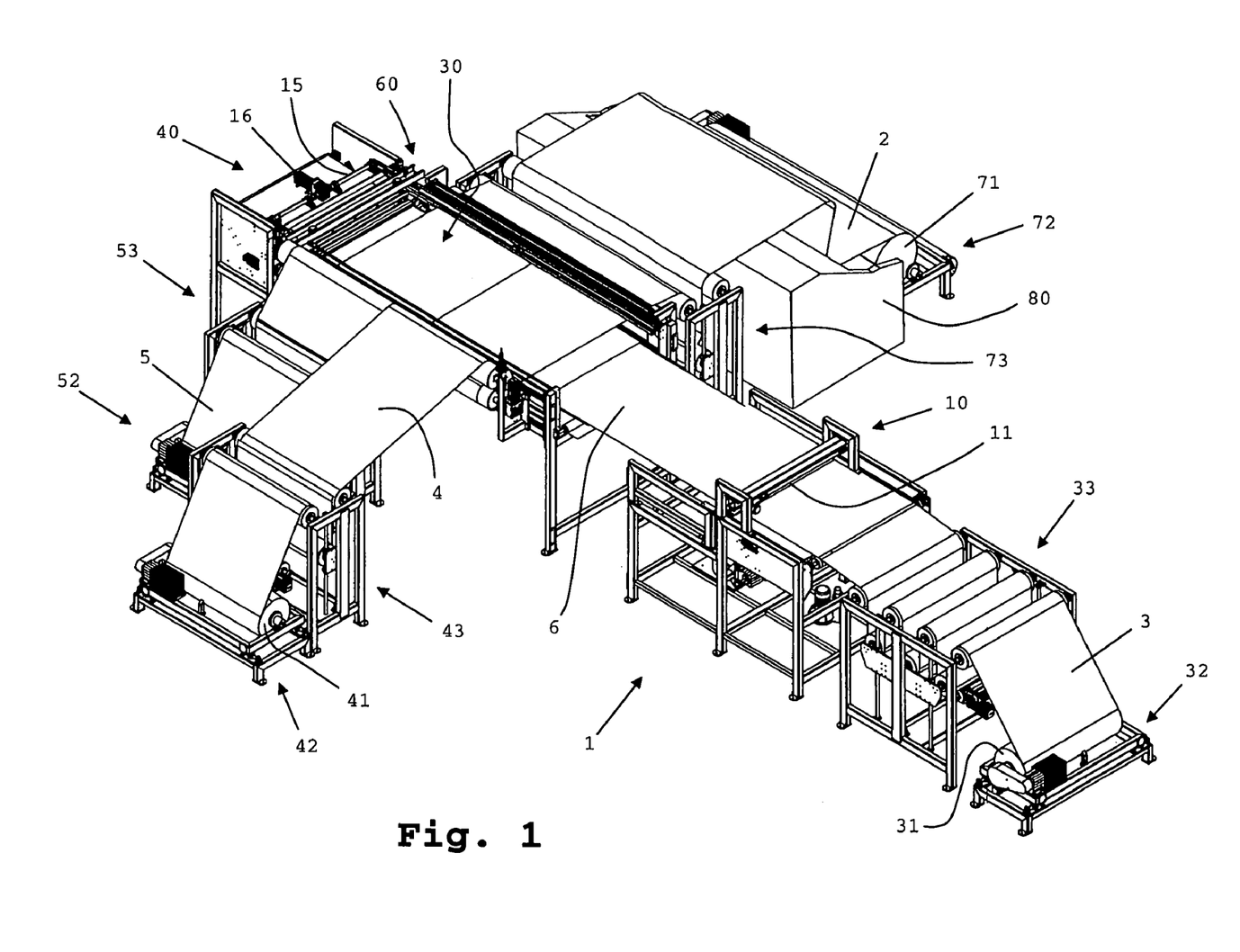
FIG. 1 is a perspective view of a device for manufacturing a crosslaid fiber web according to a first preferred embodiment of the present invention.
Figure 2:
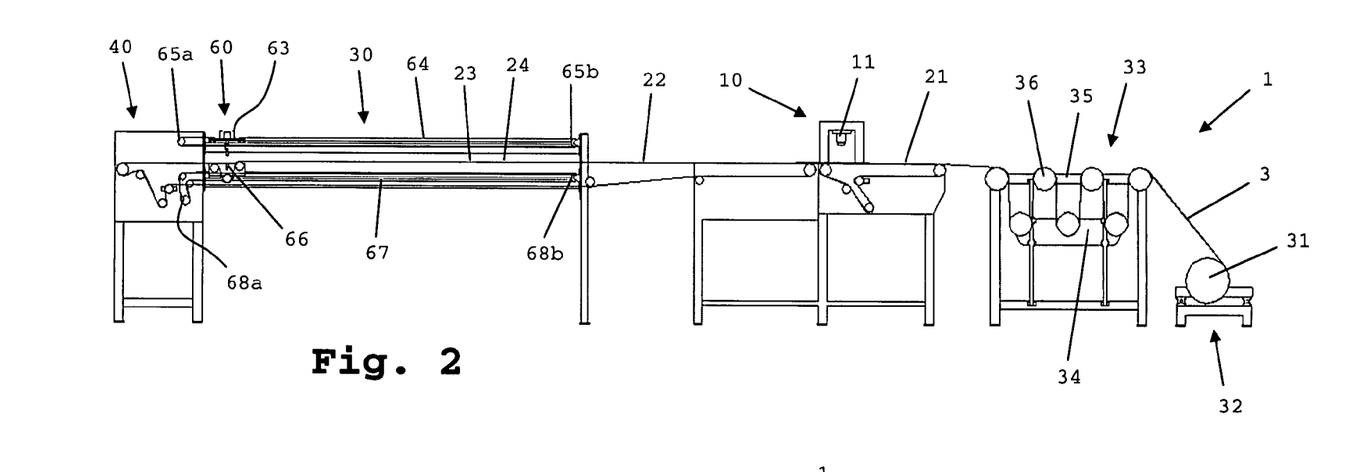
FIG. 2 is a side view of a longitudinal section in a first direction of the device shown in FIG. 1.
Figure 3:
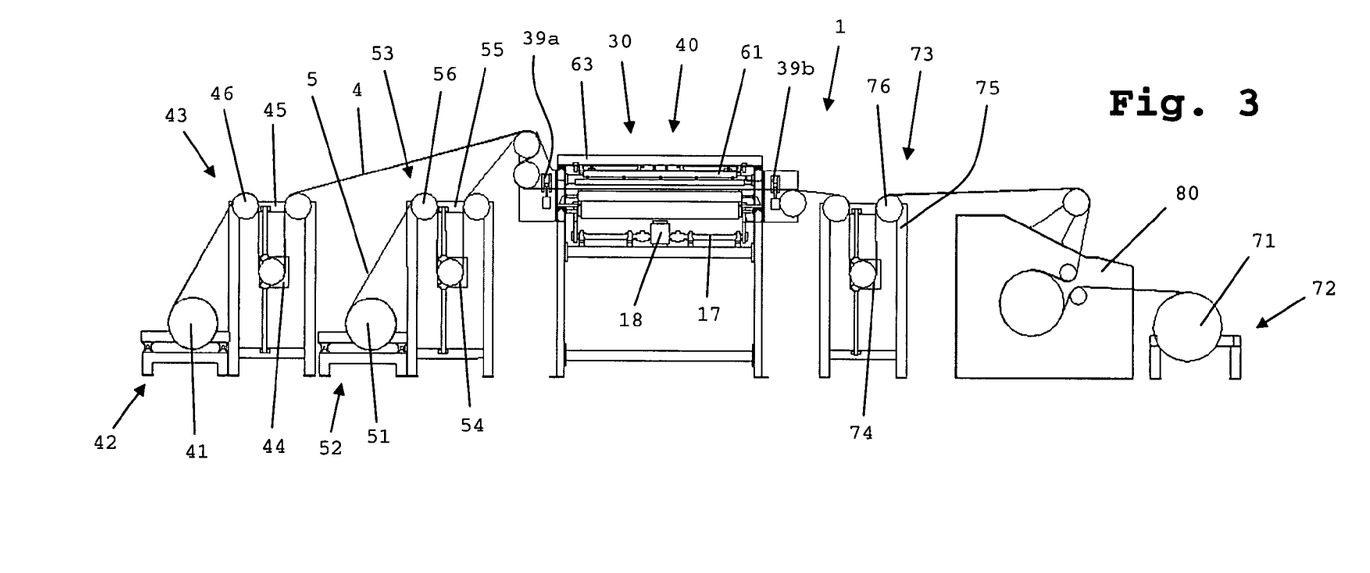
FIG. 3 is a side view of a longitudinal section in a second direction of the device shown in FIG. 1.
Figure 4:
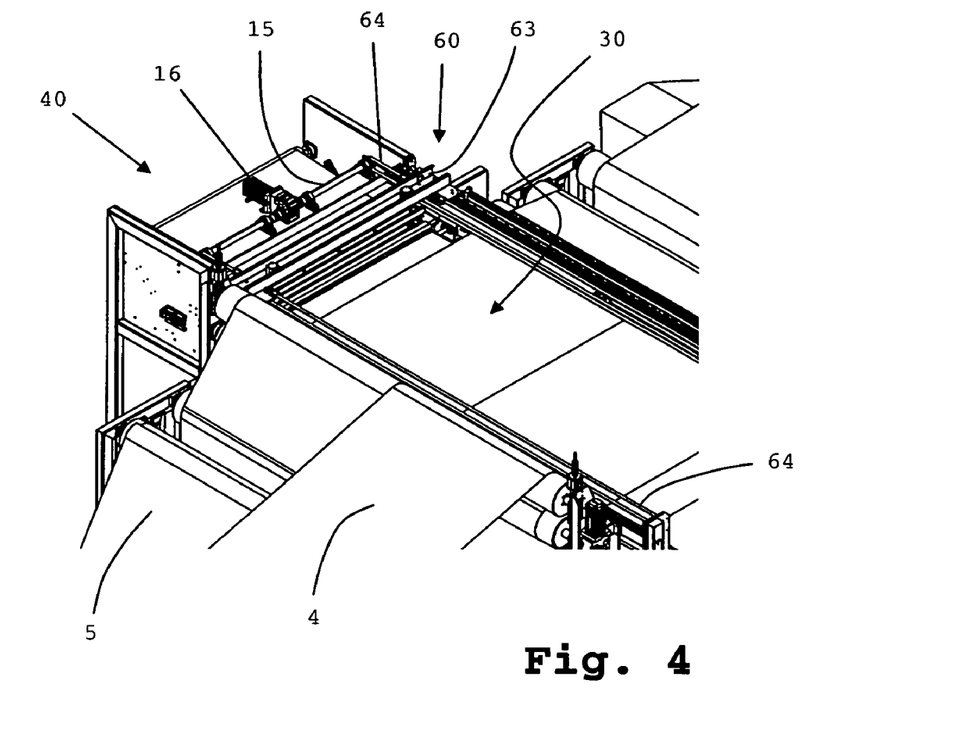
FIG. 4 shows a portion of FIG. 1 in greater detail.
Figure 5:
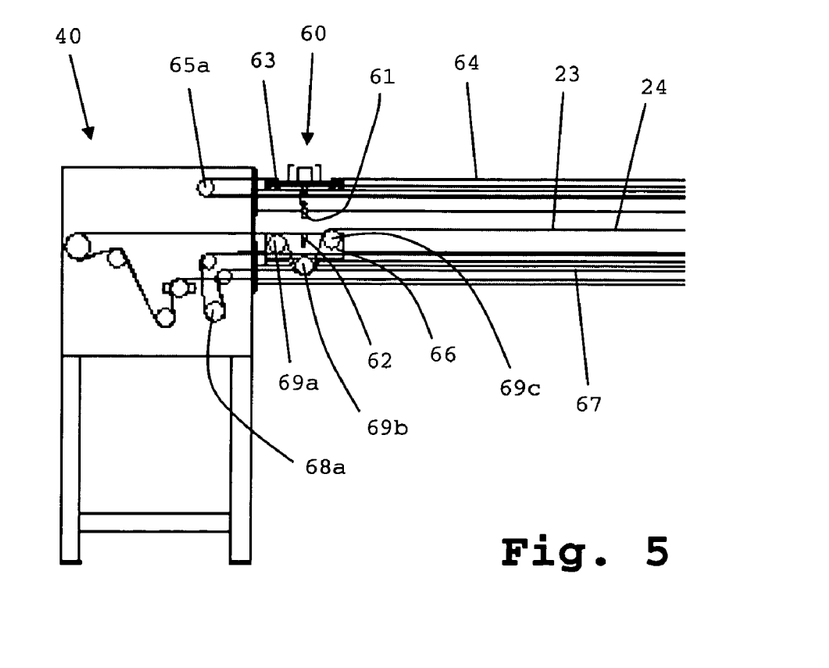
FIG. 5 shows a portion of FIG. 2 in greater detail.

FIG. 1 shows a device 1 for manufacturing a crosslaid fiber web 2 according to a first preferred embodiment of the present invention, which will hereinafter be referred to as first device 1. A portion of FIG. 1 is shown in greater detail in FIG. 4. FIGS. 2 and 3 show views of longitudinal sections of the first device 1 in two mutually different directions. A portion of FIG. 2 is shown in greater detail in FIG. 5.

The crosslaid fiber web 2 is manufactured on the basis of three longitudinal fiber webs 3, 4, 5, which are shown in the figures as well. A first longitudinal fiber web 3 is extending in a first direction in the first device 1, while a second longitudinal fiber web 4 and a third longitudinal fiber web 5 are extending next to each other in a second direction. In the shown example, the first longitudinal fiber web 3 and the second longitudinal fiber web, and the third longitudinal fiber web 5, respectively, are extending at an angle of 90° with respect to each other, which does not alter the fact that the first longitudinal fiber web 3 and the second longitudinal fiber web 4, and the third longitudinal fiber web 5, respectively, may be oriented with respect to each other at another angle.

The longitudinal fiber webs 3, 4, 5 are situated on reels 31, 41, 51, which are rotated during operation of the first device 1, wherein the longitudinal fiber webs 3, 4, 5 are wound off the reels 31, 41, 51. For the purpose of supporting and rotating the reels 31, 41, 51, the first device 1 comprises wind-off units 32, 42, 52. Furthermore, the first device 1 comprises guiding devices 33, 43, 53 for guiding the longitudinal fiber webs 3, 4, 5 in a space which is present between the wind-off units 32, 42, 52 and other components of the device 1.

The first device 1 comprises a cutting device 10 having a knife 11 for cutting off segments 6 of the first longitudinal fiber web 3. During operation of the first device 1, the first longitudinal fiber web 3 is moved under the knife 11, while the knife 11 is regularly activated for cutting loose the segments 6 from the first longitudinal fiber web 3. In a path towards the cutting device 10, the first longitudinal fiber web 3 is supported by a first conveyor belt 21. Behind the cutting device 10, as seen in a direction of movement of the segments 6, a second conveyor belt 22 is arranged, which adjoins the first conveyor belt, and which serves for supporting and further transporting the segments 6.

A length of the segments 6 is adapted to the joint width of the second longitudinal fiber web 4 and the third longitudinal fiber web 5, so that said length and width substantially equal each other, and a complete crosslaid fiber web 2 may be formed. A usual value of the width of the second longitudinal fiber web 4 and the third longitudinal fiber web 5, respectively, is 1.80 meters. In that case, a suitable value of the length of the segments 6 is 3.60 meters.

During operation of the first device 1, the cut-off segments 6 and the second longitudinal fiber web 4 and the third longitudinal fiber web 5 are put together in a positioning area 30, wherein, with the help of the second conveyor belt 22, the segments 6 are moved under the longitudinal fiber webs 4, 5, and are positioned with respect to the longitudinal fiber webs 4, 5 in such a way that the segments 6 are covering the entire width of the longitudinal fiber webs 4, 5. When a cut-off segment 6 has been put in the correct position with respect to the longitudinal fiber webs 4, 5, the longitudinal fiber web 4, 5 and the segment 6 are pressed against each other. For example, the longitudinal fiber webs 4, 5 are pressed downwards, until they touch the segment 6. The mutual position of the longitudinal fiber webs 4, 5 and the segment 6 when the segment 6 is covering the entire width of the longitudinal fiber webs 4, 5, and the segment 6 and the longitudinal fiber webs 4, 5 are pressed against each other is referred to as end position.

For the purpose of pressing the longitudinal fiber webs 4, 5 downwards, the first device 1 comprises a suitable pressing member such as a pressing bar. In FIG. 3, one can see two parts 39a, 39b of a supporting construction of such a pressing bar (which is not shown itself in FIG. 3 or any of the other figures), which are movable in the vertical direction. Each of the parts 39a, 39b comprises a relatively small cylinder having a guiding slot. In the first instance, the segment 6 and the longitudinal fiber webs 4, 5 are introduced into the positioning area 30 at different levels, so that the occurrence of a situation in which the segment 6 could bump against the longitudinal fiber webs 4, 5 and, as a consequence, could curl, is avoided. Only when the segment 6 and the longitudinal fiber webs 4, 5 are in a correct mutual position at the different levels, the longitudinal fiber webs 4, 5 are laid down against the segment 6 by applying the pressing bar, wherein the pressing bar and the supporting construction of the pressing bar are moved downwards.

When a segment 6 and a portion of the longitudinal fiber webs 4, 5 are situated in the positioning area 30, the segment 6 and the portion of the longitudinal fiber webs 4, 5 are also situated near a fixing table 40 of the first device 1. The second conveyor belt 22 is extending through this fixing table 40, and, in the end position, the segment 6 and the longitudinal fiber webs 4, 5 are supported by this second conveyor belt 22.

According to an important aspect of the present invention, the first device 1 comprises a pair of high-voltage bars 60 having an upper high-voltage bar 61 and a lower high-voltage bar 62, which is movably arranged with respect to the fixing table 40. The high-voltage bars 61, 62 serve for fixing a segment 6 with respect to the longitudinal fiber webs 4, 5 on the basis of static electricity when the segment 6 is in the end position with respect to the longitudinal fiber webs 4, 5.

The upper high-voltage bar 61 is connected to an upper carrier 63. The upper carrier 63 is elongated, and each of the ends of the upper carrier 63 is connected to an upper displacement belt 64, which is formed as a closed loop, and which is suspended on a pair of pulleys 65a, 65b. Central axes of the pulleys 65a, 65b are connected to the fixing table 40, wherein the pulleys 65a, 65b are arranged at a distance with respect to each other. When the pulleys 65a, 65b are rotating, the upper displacement belts 64 are led over the pulleys 65a, 65b, and the upper carrier 63 is displaced between the pulleys 65a, 65b.

In the shown example, a first pulley 65a of each pair of pulleys 65a, 65b is situated on an end of a shaft 15 driven by an electromotor 16. When the drive shaft 15 is set to rotation by means of the electromotor 16, the first pulleys 65a are set to rotation, and a synchronous movement of the upper displacement belts 64 is obtained, wherein the upper carrier 63 having the upper high-voltage bar 61 is displaced.

In a similar manner, the lower high-voltage bar 62 is connected to a lower carrier 66, which is displaceable with the help of two lower displacement belts 67, wherein each of the lower displacement belts 67 is suspended on a pair of pulleys 68a, 68b, and wherein a first pulley 68a of each pair of pulleys 68a, 68b is situated on an end of a shaft 17 driven by an electromotor 18.

The lower carrier 66 is arranged with respect to the second conveyor belt 22 in such a way that the lower high-voltage bar 62 is at a substantially equal height with respect to a top surface 23 of the second conveyor belt 22. Furthermore, a top part 24 of the second conveyor belt 22 is led under the lower high-voltage bar 62. To this end, three pulleys 69a, 69b, 69c are mounted on the lower carrier 66, wherein two upper pulleys 69a, 69c are at a substantially equal level with respect to the lower high-voltage bar 62, and wherein a lower pulley 69b is situated underneath the lower high-voltage bar 62. A portion of the top part 24 of the second conveyor belt 22 is wrapped around the pulleys 69a, 69b, 69c, and, as a consequence, at the position of the lower high-voltage bar 62, is led out of the plane of the top surface 23 of the other portion of the top part 24 of the second conveyor belt 22, while passing under the lower high-voltage bar 62.

The upper pulleys 69a, 69b are positioned at a somewhat different level. More in particular, a first upper pulley 69a, which has a back position when the carrier 66 is moved, is positioned at a somewhat lower level than a second upper pulley 69c. Due to this, it is achieved that the conveyor belt 22 does not again come into contact with the segment 6 when the carrier 66 has passed by, so that the segment 6 can be pulled away freely after it has been fixed on the longitudinal fiber webs 4, 5.

When a segment 6, the longitudinal fiber web 4 and the third longitudinal fiber web 5 are situated in the positioning area 30 and have been put in the end position with respect to each other, the pair of high-voltage bars 60 is applied for the purpose of fixing the segment 6, the second longitudinal fiber web 4 and the third longitudinal fiber web 5 with respect to each other. The upper high-voltage bar 61 is situated above the segment 6 and the longitudinal fiber webs 4, 5 lying above the segment 6, while the lower high-voltage bar 62 is situated under the segment 6 and the longitudinal fiber webs 4, 5 lying above the segment 6. In other words, the segment 6, the second longitudinal fiber web 4 and the third longitudinal fiber web 5 are situated between the high-voltage bars 61, 62.

For the purpose of fixing the segment 6, the second longitudinal fiber web 4 and the third longitudinal fiber web 5 with respect to each other, the pair of high-voltage bars 60 is activated, while the high-voltage bars 61, 62 are displaced with respect to the segment 6, the second longitudinal fiber web 4 and the third longitudinal fiber web 5, wherein their mutual position is maintained. It follows from the foregoing that a displacement of the high-voltage bars 61, 62 takes place with the help of pairs of displacement belts 64, 67 which are driven by electromotors 16, 18. During the fixing process, the segment 6, the second longitudinal fiber web 4 and the third longitudinal fiber web 5 stay in their place with respect to the fixing table 40.

The high-voltage bars 61, 62 are moved from one side of the positioning area 30 to an opposite side of the positioning area 30, in an activated condition. In the shown example, a length of the high-voltage bars 61, 62 is substantially equal to a width of the segment 6. Due to this, it is achieved that by realizing one movement of the high-voltage bars 61, 62, the segment 6 and the longitudinal fiber webs 4, 5 lying above the segment 6 are charged with static electricity, over the entire surface of the segment 6, and, as a consequence, exert an attractive force on each other, as a result of which the mutual fixation of the segment 6 and the longitudinal fiber webs 4, 5 lying above the segment 6 is a fact.

The high-voltage bars 61, 62 are adapted to create a relatively large potential difference between the segment 6 and the longitudinal fiber webs 4, 5 lying above the segment 6. A suitable value of the potential difference is within a range of 10 to 50 kilovolts, and is, for example, 15 kilovolts. In practice, the value of the potential difference will be determined in dependence of properties of the applied longitudinal fiber webs 3, 4, 5, such as the thickness of the longitudinal fiber webs 3, 4, 5. For sake of completeness, it is noted that the application of the high-voltage bars 61, 62 only makes sense when the applied longitudinal fiber webs 3, 4, 5 exclusively comprise non-conductive fibers or materials. A known example of non-conductive fibers is synthetic fibers.

For the purpose of definitively connecting the segment 6 and the longitudinal fiber webs 4, 5 lying above the segment 6 to each other in order to obtain a crosslaid fiber web 2, the first device 1 comprises a laminating device 80. When the segment 6 and the longitudinal fiber webs 4, 5 lying above the segment 6 have been fixed with respect to each other by applying the pair of high-voltage bars 60, the segment 6 and the longitudinal fiber webs 4, 5 lying above the segment 6 are moved out of the positioning area 30, in the direction of the laminating device 80. Preferably, the carriers 63, 66 having the high-voltage bars 61, 62 are put back to their original position when a next segment 6 is introduced into the positioning area 30. Subsequently, in the manner described in the foregoing, the carriers 63, 66 having the high-voltage bars 61, 62 may be moved along this next segment 6 and a next portion of the second longitudinal fiber web 4 and the third longitudinal fiber web 5, in order to fix this segment 6 with respect to the longitudinal fiber webs 4, 5. In this manner, the fixing process may be continually repeated in respect of successive segments 6 and portions of the longitudinal fiber webs 4, 5.

The mutual fixation of the segment 6 and the longitudinal fiber webs 4, 5 on the basis of static electricity is sufficient for guaranteeing that the segment 6 and the longitudinal fiber webs 4, 5, starting from the positioning area 30, reach the laminating device 80, while the segment 6 and the longitudinal fiber webs 4, 5 remain in the end position with respect to each other. As a consequence, it is guaranteed that the segment 6 and the longitudinal fiber webs 4, 5 are definitively connected to each other in the correct mutual position, in the laminating device 80. In the process, by placing successive segments 6 against each other, it is possible to manufacture a continuous crosslaid fiber web 2, wherein flaws on the basis of an incorrect mutual positioning of the segments 6 and the two longitudinal fiber webs 4, 5 are precluded.

For the purpose of guiding the segment 6 and the longitudinal fiber webs 4, 5 lying above the segment 6 in a space which is present between the fixing table 40 and the laminating device 80, the first device 1 comprises a guiding device 73. The crosslaid fiber web 2 is moved from the laminating device 80 to a wind-up unit 72. In the wind-up unit 72, a reel 71 is situated, and the crosslaid fiber web 2 is wound up this reel 71. The reel 71 and the crosslaid fiber web 2 which is wound up this reel 71 is an end product which is obtained on the basis of the reel 31 having the first longitudinal fiber web 3 wound up this reel 31, the reel 41 having the second longitudinal fiber web 4 wound up this reel 41, and the reel 51 having the third longitudinal fiber web 5 wound up this reel 51, and that has many applications. For example, the reel 71 having the crosslaid fiber web 2 wound up this reel 71 may be applied in a packaging process or in a process for manufacturing airbags.

In the following, the construction and the working of the guiding device 33 for guiding the first longitudinal fiber web 3 at a position between the wind-off reel 31 and the first conveyor belt 21 will be further explained.

The guiding device 33 comprises a movably arranged guiding member 34 and a frame 35 for supporting and guiding the guiding member 34. In the shown example, the guiding member 34 is displaceable in a vertical direction. The guiding device 33 comprises a total of seven rotatably arranged guiding pulleys 36, wherein four guiding pulleys 36 are arranged at an upper side of the frame 35, and wherein three guiding pulleys 36 are situated on the guiding member 34. The first longitudinal fiber web 3 is led around the guiding pulleys 36, as a result of which a wavy course of the first longitudinal fiber web 3 is realized.

The guiding device 33 also comprises control means (not shown) for determining and setting a position of the guiding member 34 with respect to the frame 35. In this context, it is assumed that the tension in the first longitudinal fiber web 3 needs to remain at a certain minimum level. On the one hand, the control means are adapted to measure the tension in the first longitudinal fiber web 3, and, on the other hand, to control displacement means (not shown) on the basis of a comparison of a measured value of the tension and a required minimum value of the tension, which displacement means are adapted to establish a displacement of the guiding member 34 with respect to the frame 35. In a practical embodiment, the displacement means comprise an electromotor, for example.

Due to the fact that the guiding member 34 of the guiding device 33 is displaceable in the vertical direction, it is possible to compensate for possible differences of the speed of the first longitudinal fiber web 3 in the vicinity of the wind-off reel 31 and on the first conveyor belt 21. By keeping the tension in the first longitudinal fiber web 3 at a certain level, sagging of the first longitudinal fiber web 3 is prevented, which sagging takes place in the path between wind-off reel 31 and the guiding device 33, for example, when the guiding member 34 would have a fixed position and when the speed of the first longitudinal fiber web 3 would be higher at the wind-off reel 31 than on the first conveyor belt 21. By the application of the guiding device 33, it is also prevented that a process of winding off the first longitudinal fiber web 3 of the wind-off reel 31 needs to stop when a segment 6 of the first longitudinal fiber web 3 is cut off and the first longitudinal fiber web 3, as a consequence, does not move, and needs to start again when, for the purpose of cutting off a next segment 6, the first longitudinal fiber web 3 moves further, covering the length of a segment 6. Instead, the wind-off reel 31 may rotate continuously at a more of less constant speed.

Depending on the application, the guiding member 34 may be displaceable in another direction than the vertical direction, for example, in a horizontal direction.

It is not necessary that the guiding device 33 comprises seven guiding pulleys 36; the number of guiding pulleys 36 may also be more or less than seven.

A difference between the guiding device 33 for guiding the first longitudinal fiber web 3 at a position between the wind-off reel 31 and the first conveyor belt 21 and the other guiding devices 43, 53, 73 of the first device 1, namely the guiding device 43 for guiding the second longitudinal fiber web 4 at a position between the wind-off reel 41 and the positioning area 30, the guiding device 53 for guiding the third longitudinal fiber web 5 at a position between the wind-off reel 51 and the positioning area 30, and the guiding device 73 for guiding the segments 6 and the longitudinal fiber webs 4, 5 lying above the segments 6 at a position between the positioning area 30 and the laminating device 80, is that the other guiding devices 43, 53, 73 comprise fewer guiding pulleys 46, 56, 76, namely three instead of seven. Two guiding pulleys 46, 56, 76 of these three guiding pulleys 46, 56, 76 are arranged at an upper side of a frame 45, 55, 75 of the guiding device 43, 53, 73, and one guiding pulley 46, 56, 76 is arranged on a guiding member 44, 54, 74 which is movably arranged with respect to the frame 45, 55, 75. Furthermore, everything that has been remarked in the foregoing with respect to the guiding device 33 for guiding the first longitudinal fiber web 3 at a position between the wind-off reel 31 and the first conveyor belt 21 is applicable to the other guiding devices 43, 53, 73 of the first device 1, in a similar manner.

As a consequence of the fact that, in the positioning area 30, the segments 6 are fixed with respect to the second longitudinal fiber web 4 and the third longitudinal fiber web 5 on the basis of static electricity, it is possible that the segments 6 and the longitudinal fiber webs 4, 5 lying above the segments 6 are led through the guiding device 73 first, before being introduced into the laminating device 80. An important advantage of the placement of the guiding device 73 in front of the laminating device 80, as seen in the direction of movement of the segments 6 and the longitudinal fiber webs 4, 5 lying above the segments 6, is that, by the working of the guiding device 73, it is possible that the segments 6 and the longitudinal fiber webs 4, 5 lying above the segments 6 are supplied to the laminating device 80 at a more or less constant speed. Therefore, the laminating process may take place in a continuous and regular fashion. Such a laminating process is preferred over a process that needs to take place in a discontinuous fashion.

Within the scope of the present invention, it is primarily important that the various parts on the basis of which a cross-laid fiber web 2 is composed, are fixed with respect to each other in an end position, before being transported further and connected to each other. Within that scope, various alternatives are possible in respect of the practical implementation of the first device 1.

As has been described in respect of the first device 1, it is possible to fix the segments 6 and the longitudinal fiber webs 4, 5 with respect to each other in the positioning area 30 on the basis of static electricity. However, a mutual fixation of the segments 6 and the longitudinal fiber webs 4, 5 may also be obtained in other ways. According to a first practical possibility, the segments 6 and the longitudinal fiber webs 4, 5 are subjected to a thermal treatment, wherein the segments 6 and the longitudinal fiber webs 4, 5 get stuck to one another. In fact, in this manner, a laminating process is already performed to some extent.

A device which is adapted to establish a mutual fixation of the segments 6 and the longitudinal fiber webs 4, 5 in the positioning area 30 under the influence of heat can be roughly of the same design as the first device 1. A difference is that such a device does not comprise high-voltage bars 61, 62, but a heated roll, which is mounted on a displaceable carrier, in a similar manner as the lower high-voltage bar 62. When a segment 6 and the longitudinal fiber webs 4, 5 lying above the segment 6 are in the positioning area 30, the heated roll is moved along a bottom side of the segment 6, as a result of which the material of the segment 6 is heated and attaches to the material of the longitudinal fiber webs 4, 5. In the process, the top part 24 of the second conveyor belt 22 is led under the heated roll, so that this is not in the way between the heated roll and the segment 6. Preferably, a pressing roll is also provided, which is mounted on a carrier, in a comparable manner as the upper high-voltage bar 61, and which moves along with the heated roll during operation of the device, in order to press the longitudinal fiber webs 4, 5 and the segment 6 against the heated roll.

Optionally, the device which is adapted to establish a mutual fixation of the segments 6 and the longitudinal fiber webs 4, 5 in the positioning area 30 under the influence of heat comprises means for pre-heating the segments 6, so that they are already heated to some extent before the positioning area 30 is actually reached. Preferably, the device also comprises means for cooling the whole of mutually fixed segments 6 and longitudinal fiber webs 4, 5 in a short period of time. Instead of a heated roll, other heating means may be applied, such as radiators.

Besides applying static electricity or heat, it is also possible to apply gluing, for example, for the purpose of fixing the segments 6 and the longitudinal fiber webs 4, 5 with respect to each other in the positioning area 30. In such a case, use is made of a self-adhesive glue, for example, which is applied to one of the segments 6 and the longitudinal fiber webs 4, 5. Preferably, a so-called open time of the glue, i.e. the time during which the glue can be effective in establishing a fixation, is relatively long, so that it is possible that the glue is applied outside the positioning area 30, and can maintain its adhesive power into the positioning area 30. For the purpose of pressing the segments 6 and the longitudinal fiber webs 4, 5 against each other in the positioning area 30, use may be made of rolls which are mounted on movable carriers, in a comparable manner as the high-voltage bars 61, 62 of the first device 1, and which may be moved along a segment 6 and longitudinal fiber webs 4, 5 lying above the segment 6, while the top part 24 of the second conveyor belt 22 can be diverted at the position of a lower pressing roll, while passing under this lower pressing roll.

An establishment of a mutual fixation of the segments 6 and the longitudinal fiber webs 4, 5 under the influence of heat or by applying gluing is particularly interesting when the applied fiber webs 3, 4, 5 comprise electrically conductive fibers, and it is not possible to apply high-voltage bars 61, 62.

When the mutual fixation of the segments 6 and the longitudinal fiber webs 4, 5 takes place on the basis of static electricity, it is important that various rollers along which the longitudinal fiber webs 4, 5 are led are insulated. The same is applicable in respect of the case that the mutual fixation of the segments 6 and the longitudinal fiber webs 4, 5 takes place under the influence of heat.

Preferably, the two conveyor belts 21, 22 of the first device 1 are adapted to retain the first longitudinal fiber web 3 and the segments 6. For example, this may be realized with the help of a suction force, wherein an underpressure is prevailing at a back side of a supporting surface of the conveyor belts 21, 22, while the conveyor belts 21, 22 are provided with a plurality of passage openings. That does not alter the fact that the conveyor belts 21, 22 may be adapted to retain the first longitudinal fiber web 3 and the segments 6 in another suitable manner, wherein, in general, the conveyor belts 21, 22 are adapted to exert an attractive force on at least a portion of a bottom surface of the first longitudinal fiber web 3 and the segments 6.

It is not necessary that the first device 1 comprises a laminating device 80 for interconnecting the second longitudinal fiber web 4, the third longitudinal fiber web 5 and the segments 6. Within the scope of the present invention, use may be made of other suitable possibilities of establishing a mutual connection between the second longitudinal fiber web 4, the third longitudinal fiber web 5 and the segments 6.

Furthermore, it is not necessary that the segments 6 are positioned under the second longitudinal fiber web 4 and the third longitudinal fiber web 5. It is also possible that the first device 1 is adapted to lay the segments 6 on the longitudinal fiber webs 4, 5 from the above.

It will be clear to a person skilled in the art that the scope of the present invention is not limited to the examples discussed above, but that several amendments and modifications thereof are possible without deviating from the scope of the invention as defined in the appended claims.

For example, it is possible to omit the third longitudinal fiber web 5, and to apply the described first device 1 for the purpose of manufacturing a crosslaid fiber web 2 on the basis of the first longitudinal fiber web 3 and the second longitudinal fiber web 4 alone. In such a case, the length of the segments 6 is adapted to the width of the second longitudinal fiber web 4 alone. An important advantage of applying the third longitudinal fiber web 5 next to the second longitudinal fiber web 4 is that, assuming standard sizes of the width of fiber webs, a crosslaid fiber web 2 which is twice as wide as a standard web may be obtained, while the production time is not notably longer than in the case of a manufacturing process of a crosslaid fiber web 2 having the standard width. On the other hand, it is also possible to apply more than two longitudinal fiber webs 4, 5 next to each other, for example three or even four longitudinal fiber webs.

In the foregoing, a device 1 for manufacturing a crosslaid fiber web 2 on the basis of two parallel longitudinal fiber webs 4, 5 and segments 6 of another longitudinal fiber web 3 is described. The device 1 comprises a fixing table 40 on which the longitudinal fiber webs 4, 5 and the segments 6 come together and are put to a suitable end position with respect to each other. A laminating device 80 is arranged at a distance from the fixing table 40, in which device 80 the longitudinal fiber webs 4, 5 and the segments 6 are definitively connected to each other.

The device 1 comprises a pair of high-voltage bars 60, movably arranged with respect to the fixing table 40. When a segment 6 is in the end position with respect to the longitudinal fiber webs 4, 5 on the fixing table 40, the pair of high-voltage bars 60 is activated and moved with respect to the segment 6 and the longitudinal fiber webs 4, 5, wherein the segment 6 and the longitudinal fiber webs 4, 5 are situated between the high-voltage bars 61, 62. As a consequence, the segment 6 is fixed with respect to the longitudinal fiber webs 4, 5, before being supplied to the laminating device 80 in order to get definitively connected to the longitudinal fiber webs 4, 5.

Besides the first device 1 described on the basis of the FIGS. 1-5, various other devices are possible within the scope of the present invention. One of the many alternatives is shown in FIGS. 6-9. More in particular, in these figures, a devoice 100 for manufacturing a crosslaid fiber web 2 according to a second preferred embodiment of the present invention is shown, which will hereinafter be referred to as second device 100.

The second device 100 has many similarities to the first device 1. In the FIGS. 6-8, important components of the second device 100 which are comparable to components of the first device 1 are indicated by the corresponding reference numerals. Particularly, this applies to a cutting device 10 for cutting off segments 6 of a first longitudinal fiber web 3, a conveyor belt 22 for supporting and transporting the cut-off segments 6, wind-off units 32, 42 and guiding devices 33, 43 for the first longitudinal fiber web 3 and a second longitudinal fiber web 4, a positioning area 30 in which the segments 6 and the second longitudinal fiber web 4 come together, a fixing table 40 and a movably arranged pair of high-voltage bars 60 which is situated at the fixing table 40 for establishing a mutual fixation of the segments 6 and the second longitudinal fiber web 4 while they are situated in the positioning area 30, a guiding device 37 for guiding the whole of the longitudinal fiber web 4 and the segments 6, a laminating device 80 for the purpose of definitively connecting the segments 6 and the second longitudinal fiber web 4 to each other in order to form the crosslaid fiber web 2, and a wind-up unit 72 for the crosslaid fiber web 2.

The remarks which have been made in the foregoing with respect to the first device 1, with the exception of remarks which could specifically relate to the manner in which supply of the longitudinal fiber webs 4, 5 to the positioning area 30 and removal of the longitudinal fiber webs 4, 5 and the segments 6 from the positioning area takes place are in a similar manner applicable to the second device 100. However, besides the many similarities, two important differences between the first device 1 and the second device 100 may be identified.

In the first place, the second device 100 is adapted to form a crosslaid fiber web 2 on the basis of the first longitudinal fiber web 3 and the second longitudinal fiber web 4 alone. That does not alter the fact that, in principle, the second device 100 could also be adapted to involve a third longitudinal fiber web 5 in the manufacturing process of the crosslaid fiber web 2.

In the second place, in the supply of the second longitudinal fiber web 4 to the positioning area 30, and in the removal of the second longitudinal fiber web 4 from the positioning area 30, another path is taken than in the first device 1. In the first device 1, the segments 6 are moved along a first straight path, and the longitudinal fiber webs 4, 5 and the whole of longitudinal fiber webs 4, 5 and the segments 6 are moved along a second straight path, wherein the first path and the second path are at a defined angle with respect to each other. In the second device 100, the segments 6 are also moved along a first straight path. However, a second path along which the longitudinal fiber web 4 and the whole of longitudinal fiber web 4 and segments 6 are moved, comprises three straight parts which are extending at angles with respect to each other.

A first part of the second path along which the longitudinal fiber web 4 and the whole of longitudinal fiber web 4 and segments 6 are moved serves for the supply of the second longitudinal fiber web 4, and is extending substantially parallel with respect to the first path along which the segments 6 are moved. A second part of the second path overlaps the positioning area 30, and serves partly for the supply of the longitudinal fiber web 4 to the positioning area 30, and partly for the removal of the longitudinal fiber web 4 and the segments 6 lying under the longitudinal fiber web 4 from the positioning area 30. The second part of the second path is extending at a defined angle with respect to the first path and the first part of the second path. A third part of the second path serves for the removal of the second longitudinal fiber web 4 and the segments 6, and is extending substantially parallel to the first path, at another side of the first path than the first part of the second path.

Figure 6:
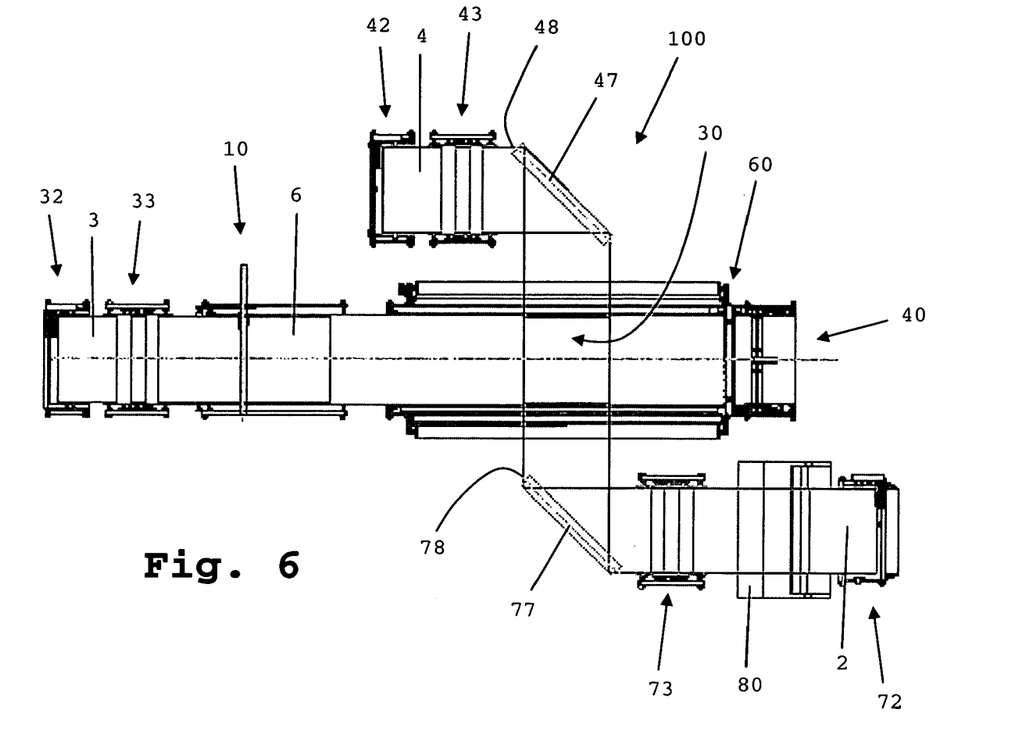
FIG. 6 is a top view of a device for manufacturing a crosslaid fiber web according to a second preferred embodiment of the present invention, which comprises a cutting device and return pulleys, wherein the cutting device and the return pulleys are shown in a first orientation.
Figure 7:
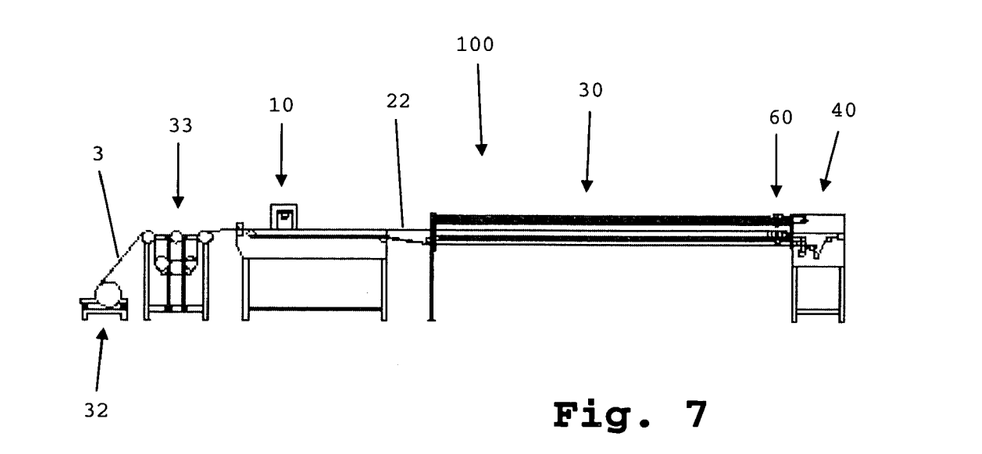
FIG. 7 is a side view of a longitudinal section in a first direction of the device shown in FIG. 6.

A transition between the adjoining parts of the second path is established by a return pulley. A first return pulley 47 is arranged at the side of the supply of the second longitudinal fiber web 4, whereas a second return pulley 77 is arranged at the side of the removal of the whole of the second longitudinal fiber web 4 and the segments 6. In the configuration as shown in FIG. 6, a longitudinal axis 48 of the first return pulley 47 is extending at an angle of substantially 45° with respect to a direction in which the second longitudinal fiber web 4 is supplied, as a result of which the second longitudinal fiber web 4, which is wrapped around the first return pulley 47, is bent away at an angle of 90°. At the other side of the second device 100, the whole of second longitudinal fiber web 4 and segments 6 is wrapped around the second return pulley 77. A longitudinal axis 78 of this return pulley 77 is extending substantially parallel to the longitudinal axis 48 of the first return pulley 47, so that the second longitudinal fiber web 4, with the segments 6, is bent away at an angle of 90° again. By applying the return pulleys 47, 77, a compact configuration is obtained with this, in which the second longitudinal fiber web 4 may be extending transversely with respect to the direction of supply of the segments 6, but in which a supply and a removal of the second longitudinal fiber web 4 and a whole of longitudinal fiber web 4 and segments 6, respectively, takes place parallel with respect to the supply of the segments 6. In the first device 1 as shown in FIG. 1, the supply and the removal of the longitudinal fiber webs 4, 5 takes place in line with each other, wherein there is no bending away of the webs 4, 5, as a result of which more space is needed on either side of the first path.

Figure 8:
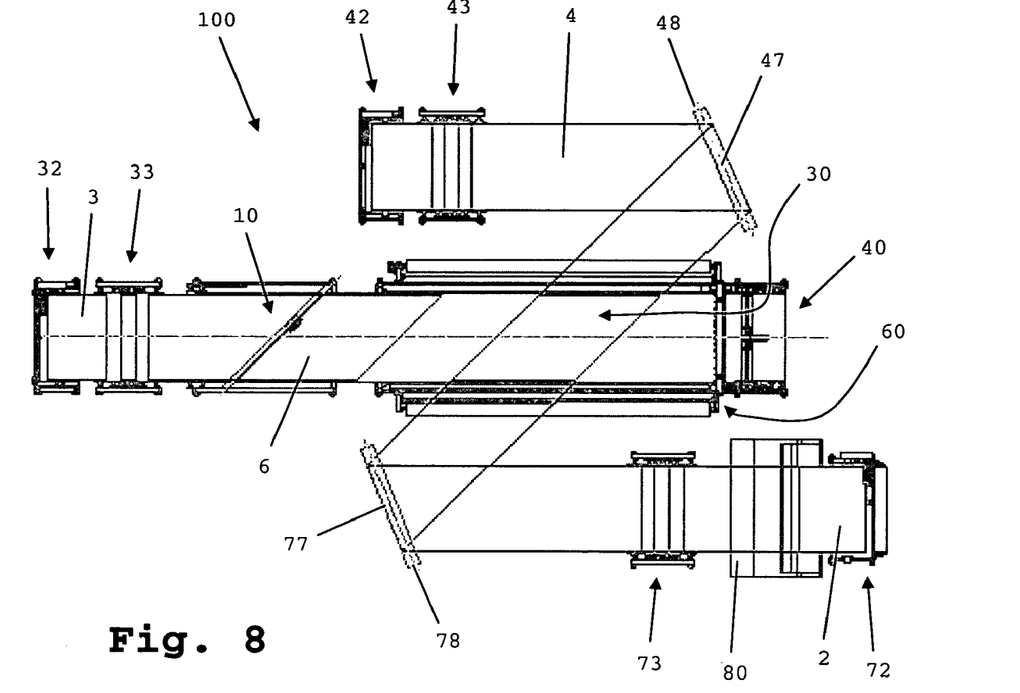
FIG. 8, once again, is a top view of the device shown in FIG. 6, wherein the cutting device and the return pulleys are shown in a second orientation.

According to an important aspect of the present invention, an angle at which the segments 6 of the first longitudinal fiber web 3 are cut off, and an angle at which the second longitudinal fiber web 4 is moved over the positioning area 30 with respect to the direction of supply of the segments 6, may be varied. In FIG. 8, the second device 100 is shown again, wherein the arrangement of the cutting device 10 and the return pulleys 4, 77 deviates from the arrangement as shown in FIG. 6. In particular, the cutting device 10 is extending at an angle which substantially deviates from 90° with respect to the first path, and the same applies to the part of the second longitudinal fiber web 4 which is situated between the return pulleys 47, 77. In this manner, it is achieved that, in the crosslaid fiber web 2, the fibers of the first longitudinal fiber web 3 and the fibers of the second longitudinal fiber web 4 are extending at another angle than 90°.

When the second device 100 is applied for the purpose of manufacturing crosslaid fiber webs 2, and it is desirable to change the angle at which the fibers of various layers in the crosslaid fiber web 2 are oriented with respect to each other, the only thing that is needed to achieve this is a change of the orientations of the cutting device 10 and the return pulleys 47, 77. This is an important advantage of the second device 100 with respect to the first device 1.

For sake of completeness, in respect of the application of the second device 100, it is noted that it is possible that instead of the second longitudinal fiber web 4, a carrier web or the like is led over the return pulleys 47, 77, which is capable of taking the segments 6 along to a positioning area outside the first path, where the segments 6 are still put into contact with a longitudinal fiber web 4.

Figure 9:
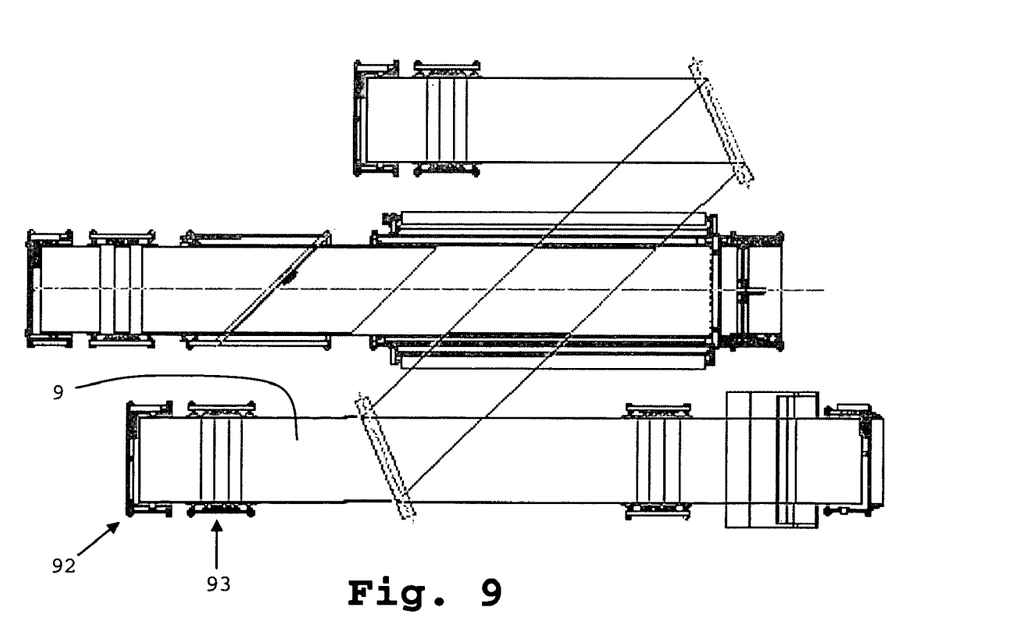
FIG. 9 is a top view of the device shown in FIG. 6, wherein an extra longitudinal fiber web is supplied.

When the second device 100 is applied as has been described above on the basis of FIGS. 6-8, it is possible that an extra longitudinal fiber web is supplied to the whole of the second longitudinal fiber web 4 and the segments 6, from the side of the second return pulley 77, wherein a crosslaid fiber web 2 having three layers is obtained in one time. This possibility is illustrated in FIG. 9, wherein the extra longitudinal fiber web is indicated by means of the reference numeral 9, and wherein a wind-off unit 92 for supplying the extra longitudinal fiber web 9 and a guiding device 93 for guiding the extra longitudinal fiber web 9 in a space which is present between the wind-off unit 92 and the second return pulley 77 are shown.

The present invention is applicable in the field of manufacturing crosslaid fiber webs on the basis of longitudinal fiber webs. That does not alter the fact that the present invention is also applicable in other fields. When the applied webs comprise fibers, it does not matter whether they are relatively thin or relatively thick fibers. Moreover, the applied webs can also comprise so-called oriented foils or fleeces (non-woven), or webs which have been stretched at least one time. In general, it is true that properties of such webs are different in different directions, and that for that reason, a certain orientation may be discerned in the webs.

What is claimed is:

1. A device for carrying out a method for manufacturing a composite web, comprising:

first supply means for supplying a cut-off segment of a first web to a positioning area;

second supply means for supplying a second web to the positioning area;

fixing means for fixing the mutual positioning of the segment and the second web when the segment and the second web are situated in the positioning area;

transport means which are adapted to further transport the segment and the second web after the mutual positioning of the segment and the second web has been fixed; and a fixing table having a supporting surface with an orientation generally parallel with the orientation of the segment and the second web, the supporting surface for supporting the segment and the second web when they are situated in the positioning area, wherein the fixing means are movably arranged with respect to the fixing table, and wherein the fixing means comprise at least one member which is arranged at a position of an interruption of the orientation of the supporting surface, yet at a substantially equal level as the supporting surface;

wherein the fixing means comprise a pair of movably arranged high-voltage members shaped like a bar, which, in an activated condition, is capable of creating a potential difference between the segment and the second web, wherein one bar is moved along the segment and the second web at the side of the segment, and wherein another bar is moved along the segment and the second web at the side of the second web, while a mutual positioning of the bars is maintained.

2. A device according to claim 1, wherein the supporting surface comprises a surface of a conveyor belt, and wherein diversion means are provided for diverting the conveyor belt at the position of the member of the fixing means which is arranged at a substantially equal level as the supporting surface.

3. A device according to claim 2, wherein the member of the fixing means which is arranged at a substantially equal level as the supporting surface is mounted on a movably arranged carrier, and wherein the diversion means comprise rotatably arranged pulleys which are also mounted on the movably arranged carrier.

4. A device according to claim 1, wherein the high-voltage members are adapted to create a potential difference between the segment and the second web, which is within a range of 10 to 50 kilovolts.

5. A device according to claim 1, further comprising at least one guiding device for guiding at least one of the first web, the second web and a composite web which comprises the second web and segments of the first web, comprising a frame and guiding pulleys which are destined to come into contact with the web, wherein a number of the guiding pulleys are displaceable with respect to the frame.

6. A device according to claim 5, wherein the guiding pulleys which are displaceable with respect to the frame are arranged on a guiding member which is displaceable with respect to the frame according to a substantially straight line.

7. A device according to claim 6, further comprising displacement means for displacing the guiding member with respect to the frame; and control means for determining the position of the guiding member with respect to the frame and controlling the displacement means.

8. A device according to claim 5, comprising a guiding device for guiding a composite web which comprises the second web and segments of the first web, wherein the guiding device is arranged between the positioning area and a device for establishing a fixed connection between the second web and the segments.

9. A device which is suitable for application for the purpose of carrying out a method for manufacturing a composite web on the basis of a first web and a second web, comprising:

first guiding means for guiding a cut-off segment of the first web in a first direction;

second guiding means for successively guiding the second web in a direction which is substantially equal to the first direction, in a second direction which deviates from the first direction to a defined extent, and, once again, in a direction which is substantially equal to the first direction, such that guiding the second web involves several directions in the course of the second web, being at least two parallel directions and one deviant direction;

wherein an arrangement of the second guiding means with respect to the first guiding means is adapted to letting the second web overlap the segments of the first web when the second web is extending in the second direction.

10. A device according to claim 9, comprising:

a transport member for transporting the segments in the first direction;

a supply device for supplying the second web in a direction which is substantially equal to the first direction, wherein the supply device is arranged next to the transport member;

two return pulleys which are arranged on either side of the transport member, wherein the second web needs to be wrapped around these pulleys, wherein a longitudinal axis of the return pulleys is extending in a direction which deviates from a direction perpendicular to the first direction; and a removal device for removing the second web in a direction which is substantially equal to the first direction, wherein the removal device is arranged next to the transport member, at another side than the side where the supply device is arranged.

11. A device according to claim 10, wherein the direction in which the longitudinal axis of the return pulleys is extending is adjustable.

12. A device according to claim 9, suitable for manufacturing a composite web on the basis of a first web, a second web and a third web, comprising third guiding means for guiding the third web in a direction which is substantially equal to the first direction, wherein an arrangement of the third guiding means with respect to the second guiding means is adapted to letting the third web overlap the second web when he second web, for a second time, is led in a direction which is substantially equal to the first direction.

13. A device according to claim 12, comprising a supply device for supplying the third web in a direction which is substantially equal to the first direction, wherein the supply device is arranged next to the transport member, at the side where the removal device is arranged.

14. A device for carrying out a method for manufacturing a composite web, comprising:

first supply means for supplying a cut-off segment of a first web to a positioning area;

second supply means for supplying a second web to the positioning area;

fixing means for fixing the mutual positioning of the segment and the second web when the segment and the second web are situated in the positioning area;

transport means which are adapted to further transport the segment and the second web after the mutual positioning of the segment and the second web has been fixed; and definitive connection means that receives the segment and the second web after the mutual positioning of the segment and the second web has been fixed, to definitively connect the segment and the second web to one another;

wherein the device defines a path followed by the second web with respect to the cut-off segment comprising a first part and a third part in a direction that is substantially the same as a direction in which the cut-off segment is guided, and a second part between the first part and the third part in another direction, wherein the second web is made to overlap the cut-off segment in the second part of the path.

15. A device according to claim 14, further comprising a fixing table having a supporting surface with an orientation generally parallel with the orientation of the segment and the second web, the supporting surface for supporting the segment and the second web when they are situated in the positioning area, wherein the fixing means are movably arranged with respect to the fixing table, and wherein the fixing means comprise at least one member which is arranged at a position of an interruption of the orientation of the supporting surface, yet at a substantially equal level as the supporting surface.

16. A device for carrying out a method for manufacturing a composite web, comprising:

first supply means for supplying a cut-off segment of a first web to a positioning area;

second supply means for supplying a second web to the positioning area;

fixing means for fixing the mutual positioning of the segment and the second web when the segment and the second web are situated in the positioning area;

transport means which are adapted to further transport the segment and the second web after the mutual positioning of the segment and the second web has been fixed ; and a fixing table having a supporting surface with an orientation generally parallel with the orientation of the segment and the second web, the supporting surface for supporting the segment and the second web when they are situated in the positioning area, wherein the fixing means are movably arranged with respect to the fixing table, and wherein the fixing means comprise at least one member which is arranged at a position of an interruption of the orientation of the supporting surface, yet at a substantially equal level as the supporting surface;

wherein the device defines a path followed by the second web with respect to the cut-off segment comprising a first part and a third part in a direction that is substantially the same as a direction in which the cut-off segment is guided, and a second part between the first part and the third part in another direction, wherein the second web is made to overlap the cut-off segment in the second part of the path.

* * * * *